United States Patent

[11] 3,571,898

[72] Inventor  Ernst Fuhrmann
              Burscheid, Germany
[21] Appl. No. 729,788
[22] Filed     May 16, 1968
[45] Patented  Mar. 23, 1971
[73] Assignee  Goetzewerke Friedrich Goetze A.G.
              Burscheid, Germany
[32] Priority  May 20, 1967
[33]           Germany
[31]           G50,202

[54] METHOD FOR MARKING AND DETERMINING THE ORIENTATION OF PISTON RINGS
7 Claims, 4 Drawing Figs.

[52] U.S. Cl. .................................................. 29/407,
     29/156.6, 209/111.5, 250/106
[51] Int. Cl. .................................................. B23q 17/00
[50] Field of Search .................................. 29/156.6,
     407; 198/38; 101/2; 209/111.5, 75; 250/59, 106 (T)

[56]            References Cited
                UNITED STATES PATENTS
2,471,489  5/1949  Lucas et al. ..................  209/75
2,580,342  12/1951 Aller et al. ....................  209/75
2,988,984  6/1961  Eckert, Jr. et al. ............  101/2
3,012,144  12/1961 Martin ..........................  250/106(X)
3,100,840  8/1963  Morganstern ................  250/106(X)
3,296,689  1/1967  Daughters ....................  29/407

Primary Examiner—John F. Campbell
Assistant Examiner—Victor A. DiPalma
Attorney—Spencer & Kaye

ABSTRACT: A method and apparatus for determining the orientation of a split piston ring; in particular, for determining whether the ring lies right side up or upside down. A mark made at least in part of an active substance is applied to the piston ring in the region of one of its gap ends and the ring is moved past a device for sensing the presence of the active substance.

PATENTED MAR 23 1971 3,571,898
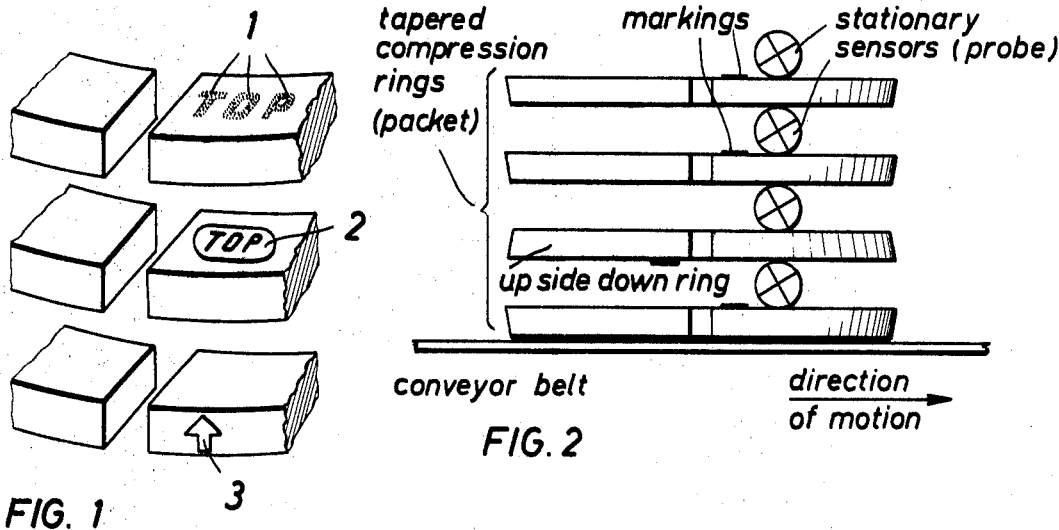
FIG. 1
FIG. 2
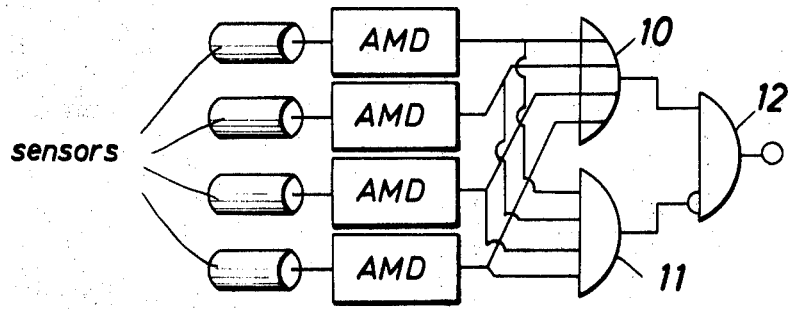
FIG. 3
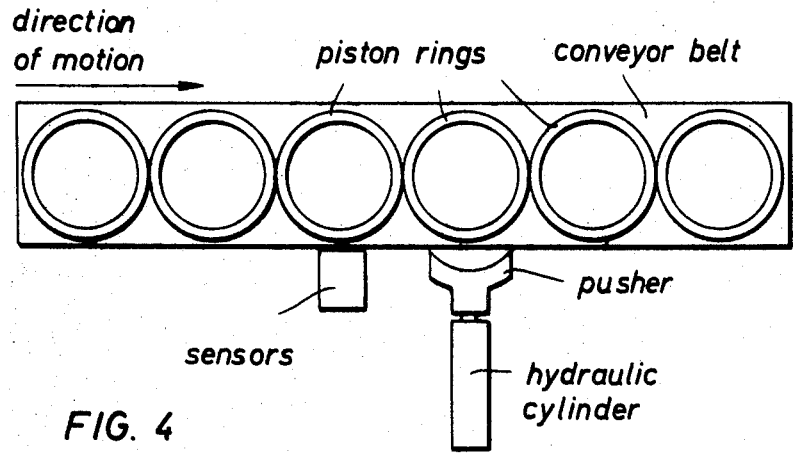
FIG. 4
INVENTOR
Ernst FUHRMANN
By Spencer & Kaye
Attorney

METHOD FOR MARKING AND DETERMINING THE ORIENTATION OF PISTON RINGS

BACKGROUND OF THE INVENTION

The present invention relates to a method for marking and monitoring piston rings such as tapered compression rings oil-scraper rings and wedge type rings or the like having sliding surfaces which deviate from the shape of the cylinder. In particular, the present invention relates to a method for marking piston rings on a particular gap end and then monitoring the rings to ensure that the rings are arranged in their proper orientation.

Piston rings, especially those rings of the type having sliding surfaces which deviate from the shape of the cylinder such as tapered compression rings or the like, are marked to ensure that each ring will be assembled in an engine right side up. Normally each ring is marked by stamping the word "Top" on the upper side thereof at a point near to the ring gap.

However, even if every ring is properly stamped with the "-Top" mark on the side thereof which should face the combustion chamber of the engine, it does frequently occur that individual rings become accidentally reversed during subsequent processing and packing and, as a result, come to lie upside down in a piston ring packet.

Although piston rings which lie upside down in the piston ring packet can nevertheless be placed right side up in the grooves of the piston if they are assembled manually and proper attention is paid to the "Top" mark, a control of the proper position of the individual rings prior to their assembly is not possible when they are installed by automatic assembly machines since these machines are fed with the packets of piston rings taken directly from the package. If piston rings are assembled incorrectly, not only do they interfere with the proper operation of the engine, but, depending on the ring, they often also make it necessary to disassemble the engine to correct the error.

SUMMARY OF THE INVENTION

An object of the present invention, therefore, is to find a method for marking and controlling the packing of piston rings that provides a simple and reliable test for a packet of piston rings to ensure that each individual ring in the packet lies right side up.

This as well as other objects which will become apparent in the discussion that follows is achieved, according to the present invention, by applying a marking substance to the ring which has a constituent that influences a control device so that when each piston ring is passed by the control device, the presence or absence of the component and, thus, the orientation of the piston ring can be sensed. The control device can be designed in the manner well known in the art to give an optical, acoustical and/or electrical signal in response to the absence of the component, to inform an operator that a ring is incorrectly positioned, or, in accordance with a preferred embodiment of the present invention, to initiate the operation of means for automatically sorting out the incorrectly oriented ring.

It is possible, in accordance with the present invention, for example, to add magnetized elementary particles to the marking substance or to enrich the substance with radioactive isotopes. These active materials, when passed by a control device, such as an electromagnet or a Geiger counter, respectively, can cause an output signal to be produced if and only if all of the piston rings in a packet lie side up. This substance thus allows not only individual piston rings but also piston ring packets — even packets that are already covered with packaging material — to be easily tested to ensure the proper orientation of each individual ring.

It is possible to apply the mark to the sliding surface as well as to the side or flank of a piston rings. If a magnetically or radioactive substance is employed which may be brushed or painted onto the piston ring — which substance may also include coloring matter — it can be easily applied to the piston ring in the form of lines, or points or any other recognizable mark. This kind of marking on the piston ring sliding surface in no way impairs the sealing capacity of the ring when installed in an engine since the mark will be rubbed off already after the first piston stroke.

If the "Top" mark is indicated on an aluminum foil which is stamped on the side of the piston ring, it is possible, according to a further embodiment of the present invention, to permeate this foil with magnetic particles or radioactive isotopes before it is stamped. If the "Top" mark is hammered into the side surface of the ring in the form of small depressions it is possible also to fill these depressions with a corresponding active substance.

The important feature of the marking and controlling method, according to the present invention, is that the piston ring marking is achieved by the application of an active substance so that the orientation of the ring can be controlled without any mechanical contract. The control itself is effected by passing the ring or a packet of rings by a control device which indicates by a signal the presence of a piston ring which lies upside down.

The nonmechanical contact control method according to the present invention makes it possible to test not only piston ring packets which are unpackaged but also those which are already wrapped in packaging material for the correct orientation of each individual ring.

According to a particular embodiment of the present invention, when the apparatus used to control the orientation of individual piston rings provides a signal indicating that a particular ring is incorrectly oriented, this ring is automatically sorted out or removed from the other rings that have been tested.

The method according to the present invention makes it possible to control piston rings during their manufacture and/or after they have been packaged in packets to ensure that all the rings within a ring packet will be arranged right side up. This method, and the apparatus for carrying out this method, therefore provides an additional measure of certainty to the desired objective that all the piston rings will automatically be correctly assembled in an engine.

BRIEF DESCRIPTION OF THE DRAWINGS

FIG. 1 is a perspective view showing the gap ends of three piston rings which are marked according to the present invention.

FIG. 2 is an elevational and partly schematic diagram illustrating the method and apparatus for sensing the orientation of the piston rings in a packet, according to the present invention.

FIG. 3 is a schematic diagram of the electrical circuit employed in the method and apparatus illustrated in FIG. 2.

FIG. 4 is a top and partially schematic diagram of the apparatus for sorting out incorrectly oriented piston rings according to the present invention.

DESCRIPTION OF THE PREFERRED EMBODIMENTS

Referring now to the drawings, FIG. 1 illustrates how an active substance may be applied to the gap end of a piston ring to provide a visual mark and a mark which will activate a nonmechanical control device according to the present invention.

In the portion of the ring shown at the top of FIG. 1 the mark is made by stamping the word "Top" on the side surface thereof with a die. The depressions 1 formed by the die may then be filled with a paint which carries the active substance.

The portion of the piston ring shown in the middle of FIG. 1 is marked with an aluminum foil 2. The foil, which also visually indicates the upper side of the ring by the word "-Top", is stamped on the appropriate side of the ring and permeated with the active substance according to the present invention.

The portion of the piston ring shown at the bottom of FIG. 1 is marked on the sliding surface thereof with a paint which contains the active substance. The mark, which can take any shape but which, in FIG. 1, is shown as an arrow 3, will be removed by the scoring action of the cylinder wall during the first stroke of the piston.

FIG. 2 schematically illustrates one embodiment of the apparatus for sensing the marking on a packet of piston rings. The packet of rings, which in this case contains four individual rings, is moved by a conveyor belt past four stationary sensors. The gaps of all the rings in the packet are placed in vertical alignment so that, if all the rings are properly oriented, the various markings will be simultaneously sensed.

In the packet shown in FIG. 2 one of the rings is upside down. As the packet of rings is moved past the sensors, only three of the four sensors will be triggered.

FIG. 3 schematically shows an electrical circuit which may be connected to the sensors in FIG. 2 to produce an output pulse in every case where less than all the sensors sense a marking. No pulse is produced when no marking is sensed and when all the sensors sense a marking simultaneously. The output of each of the sensors is amplified, as required, and fed as an input to an OR gate 10 and an AND gate 11. The outputs of the OR gate 10 and the AND gate 11 are, in turn, fed as inputs to the AND-NOT gate 12. The gate 12 produces an output if and only if it receives an input from the OR gate 10 without receiving an input from the AND gate 11. The circuit of FIG. 3 may be adapted for use with any number of sensors greater than two.

If it is desired, for example, to sense only a single ring at a time, it is possible to arrange a sensor directly above the piston ring. If the sensor is made large enough, it can scan the entire upper surface of the piston ring for the piston ring marks making it unnecessary to align the gap of each ring in any particular direction. The piston rings may then simply be placed on the conveyor with the marked side down (facing the conveyor) and moved by the conveyor beneath the single sensor. Were the sensor to sense a marking, it would indicate that the piston ring were upside down.

FIG. 4 illustrates a particular embodiment of apparatus which may be used to sort out a piston ring or piston ring packet containing a piston ring which is upside down. The apparatus includes the usual conveyor which moves the piston rings or piston ring packet sequentially past the sensor or sensors. The apparatus also includes a pusher which is operated by a hydraulic cylinder in synchronism with the motion of the conveyor belt to remove the upside-down ring or ring packet containing an upside-down ring from the series of rings or ring packet, respectively. Whenever the sensors, which may be the type shown in FIGS. 2 and 3 and described above, detect a ring that is upside down, the sensor circuit sets a flip-flop or other suitable memory device which actuates the pusher at the moment when the conveyor belt has moved the ring or ring packet into alignment therewith. The pusher then pushes the ring or packet off the conveyor belt onto a table or into a suitable receptacle for further processing by hand.

It will be understood that the above description of the present invention is susceptible to various modifications, changes and adaptations, and the same are intended to be comprehended within the meaning and range of equivalents of the appended claims.

I claim:

1. A method of determining the orientation of split piston rings each having a pair of side surfaces and a noncylindrical sliding surface, comprising the steps of:
   a. applying a mark to a predetermined one of the side and sliding surfaces of a split ring; and
   b. scanning at least a portion of the ring for sensing the presence of the mark in a predetermined position as an indication of the orientation of the ring.

2. The method defined in claim 1 wherein said applying step includes applying an active substance to at least partially form the mark.

3. The method defined in claim 2 wherein the active substance includes radioactive isotopes.

4. The method defined in claim 2 wherein the active substance is magnetic.

5. The method defined in claim 3 wherein said scanning and sensing step includes the step of moving a Geiger counter relative to said ring.

6. The method defined in claim 4 wherein said scanning and sensing step includes the step of moving an electric coil relative to said ring.

7. The method defined in claim 1, further including the step of simultaneously scanning and sensing a plurality of piston rings.